(12) United States Patent
Yoshida et al.

(10) Patent No.: US 8,033,608 B2
(45) Date of Patent: Oct. 11, 2011

(54) VEHICLE SEAT

(75) Inventors: Nao Yoshida, Toyota (JP); Yutaka Iwahori, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 343 days.

(21) Appl. No.: 12/304,200

(22) PCT Filed: Apr. 8, 2008

(86) PCT No.: PCT/JP2008/056955
§ 371 (c)(1),
(2), (4) Date: Dec. 10, 2008

(87) PCT Pub. No.: WO2008/132998
PCT Pub. Date: Nov. 6, 2008

(65) Prior Publication Data
US 2009/0243359 A1  Oct. 1, 2009

(30) Foreign Application Priority Data
Apr. 16, 2007 (JP) .................. 2007-107449

(51) Int. Cl.
*B60N 2/20* (2006.01)
(52) U.S. Cl. .................. 297/378.12; 297/341
(58) Field of Classification Search .................. 297/341, 297/367 R, 378.12, 378.14
See application file for complete search history.

(56) References Cited

U.S. PATENT DOCUMENTS

| | | | |
|---|---|---|---|
| 4,973,104 A | 11/1990 | Nakayama et al. | |
| 5,052,748 A * | 10/1991 | Fourrey et al. | 297/124 |
| 5,482,349 A * | 1/1996 | Richter et al. | 297/15 |
| 6,030,042 A | 2/2000 | Bauer et al. | |
| 6,139,104 A * | 10/2000 | Brewer | 297/353 |
| 6,447,066 B1 * | 9/2002 | Chabanne et al. | 297/367 R |
| 6,464,299 B1 * | 10/2002 | Castagna | 297/378.12 |
| 6,513,875 B1 * | 2/2003 | Gray et al. | 297/378.14 |
| 6,513,876 B1 * | 2/2003 | Agler et al. | 297/378.14 |
| 7,025,422 B2 * | 4/2006 | Fast | 297/378.14 |
| 7,374,244 B2 * | 5/2008 | Becker et al. | 297/341 |
| 2002/0050733 A1 * | 5/2002 | Hansel et al. | 297/367 |

FOREIGN PATENT DOCUMENTS

| | | |
|---|---|---|
| JP | 64-52942 U | 3/1989 |
| JP | 1-133041 U | 9/1989 |
| JP | 2002-193003 | 7/2002 |

OTHER PUBLICATIONS

English language partial translation of JP 64-52942 U.
English language Abstract of JP 2002-193003.

* cited by examiner

*Primary Examiner* — Peter R. Brown
(74) *Attorney, Agent, or Firm* — Greenblum & Bernstein, P.L.C.

(57) ABSTRACT

A vehicle seat is provided with: a rotation lock mechanism for inhibiting or permitting rotation of the both support arms placed at a fixed position relative to base frames and a support arm operation mechanism for actuating the rotation lock mechanism by tilting of a backrest. In the vehicle seat, when the backrest is tilted forward beyond a maximum forward adjustment angle of a reclining angle range, the rotation of the both support arms from the fixed position is permitted. When the backrest is tilted further backward than the maximum forward adjustment angle, the rotation of the both support arms from the fixed position is inhibited.

2 Claims, 11 Drawing Sheets

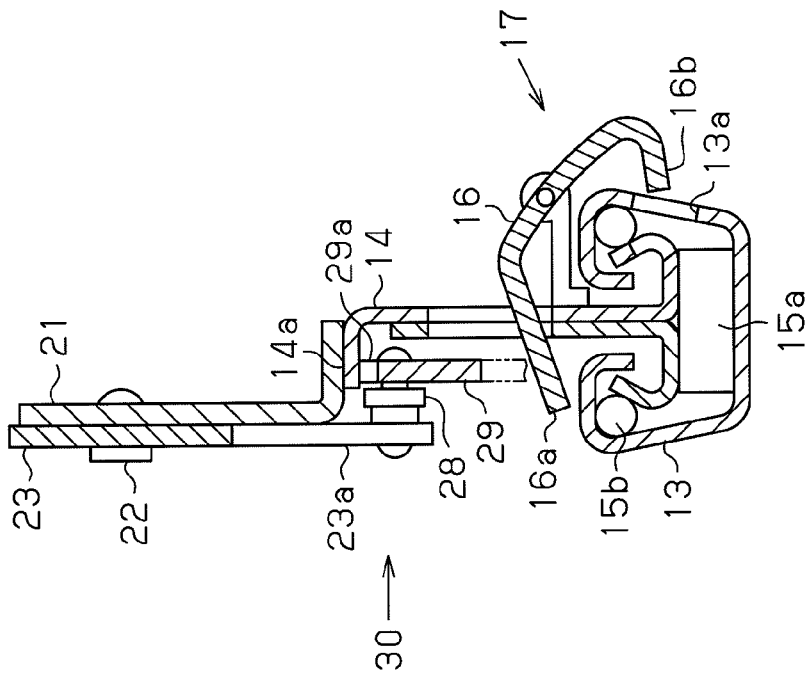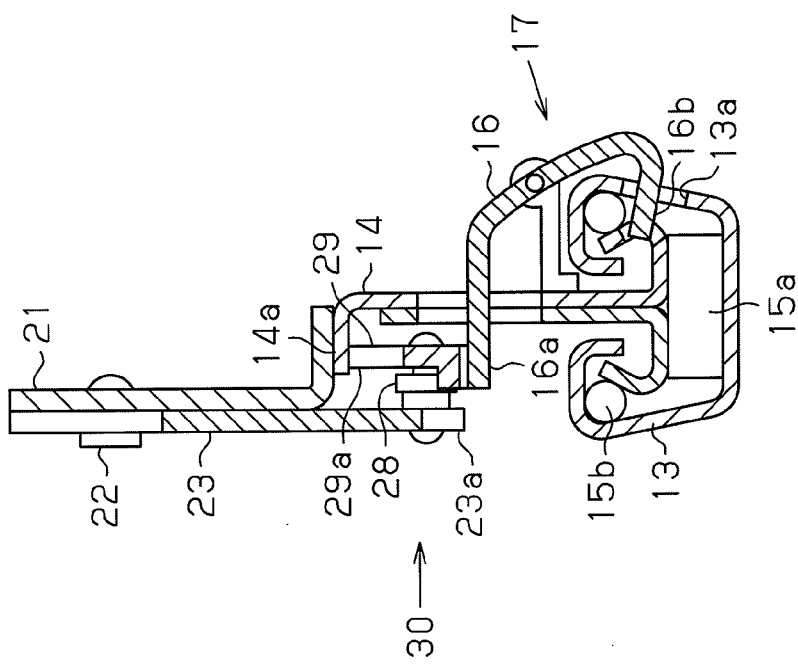

VEHICLE SEAT

FIELD OF THE INVENTION

The present invention relates to a vehicle seat of which the backrest can be tilted forward and upward when an occupant gets into the backseat.

BACKGROUND OF THE INVENTION

This type of vehicle seat is disclosed in Patent Document 1, for example. As shown in FIG. 11, a seat portion 100 of a vehicle seat is equipped with a walk-in mechanism shaft 101. the front end of a base 102 is rotatably supported by the walk-in mechanism shaft 101. The rear end of the base 102 is fixed by a latch 104 relative to a striker 103 provided in the seat portion 100. At rear end of the base 102, a backrest 106 is rotatably supported by means of a reclining mechanism 105. The backrest 106 can rotate about a reclining shaft 107 of the reclining mechanism 105. A reclining angle of the backrest 106 can be adjusted within a predetermined angle range.

A reclining action of the backrest 106 is performed in a state where the rotation of the base 102 relative to the seat portion 100 is inhibited by the engagement of the latch 104 with the striker 103. When an operation member (not shown) is operated to disengage the latch 104 from the striker 103, the base 102 is rotated relative to the seat portion 100. In this state, a walk-in action is performed, in which the backrest 106 is moved forward and upward by being rotated around the walk-in mechanism shaft 101.

Further, the rotation of the base 102 around the walk-in mechanism shaft 101 pulls a wire 108, and as a result, a fixed state of a seat slide mechanism (not shown) is cancelled. Thereby, the entire seat is biased by a spring (not shown) so as to be slid, which further moves the seat forward and upward. As a result, the space between a front seat and a backseat becomes large, and thus, the entry into the backseat is facilitated.

However, in the vehicle seat described in Patent Document 1, the reclining action and the walk-in action of the backrest 106 are independently performed. This necessitates the rotation of the backrest 106 around the walk-in mechanism shaft 101 with the latch 104 disengaged from the striker 103, while maintaining a reclining angle at that time. Therefore, for example, when the backrest 106 is rotated forward and upward while being at the most reclined position within a predetermined angle range, the backrest 106 cannot be moved sufficiently forward and upward relative to the seat portion 100. In particular, in a two-door vehicle such as a coupe, a sliding amount of the seat is small, and thus, a sufficient space between the front seat and the backseat cannot be secured. In this case, when a passenger gets into the backseat, the passenger's body or hand-carried luggage tends to hit the backrest 106, and thus, it is not easy for a passenger to get into the backseat.

Patent Document 1: Japanese Laid-Open Utility Model Publication No. 1-133041

SUMMARY OF THE INVENTION

An objective of the present invention is to provide a vehicle seat that allows a backrest to be sufficiently moved forward and upward relative to a seat portion, and facilitates the entry into the backseat even in a vehicle having a relatively small space between a front seat and a backseat.

To solve the above-described problem, according to a first aspect of the present invention, provided is a vehicle seat including: a pair of base frames supporting a seat portion of a vehicle; a pair of backrest support arms of which front ends are rotatably supported relative to side surfaces of both base frames; a rotation lock mechanism for inhibiting or permitting rotation of both backrest support arms placed at a predetermined fixed position relative to the both base frames; a backrest rotatably supported by rear ends of the both backrest support arms; and a reclining mechanism for adjusting a reclining angle of the backrest relative to the both base frames. In the vehicle seat, the reclining mechanism holds the backrest at an upright angle within a predetermined reclining angle range, and inclines the backrest forward beyond a maximum forward adjustment angle of the reclining angle range. The vehicle seat is further provided with a support arm operation mechanism for actuating the rotation lock mechanism based on tilting of the backrest caused by the reclining mechanism. The support arm operation mechanism permits the rotation of the both backrest support arms from the fixed position when the backrest is tilted forward beyond the maximum forward adjustment angle of the reclining angle range. The support arm operation mechanism inhibits the rotation of the both backrest support arms from the fixed position when the backrest is tilted further backward than the maximum forward adjustment angle.

According to the configuration, when the backrest is tilted forward beyond the maximum forward adjustment angle, both backrest support arms are rotated, and thereby, the backrest is moved forward and upward. That is, the backrest is moved forward and upward while being tilted forward. In other words, the forward-and-upward movement of the backrest while being tilted backward is prevented. Therefore, the backrest can be moved sufficiently forward and upward relative to the seat portion. Accordingly, even in a vehicle in which there is no a sufficient interval between the front seat and the backseat, a passenger can easily get into the backseat.

The above-described vehicle seat is provided with: a slide base supporting slidably and movably the base frames along a back-and-forth direction of the vehicle; a slide lock mechanism for inhibiting or permitting a slide movement of the base frames relative to the slide base; and a slide operation mechanism for actuating the slide lock mechanism based on the rotation of both backrest support arms. The slide operation mechanism preferably permits slide movement of the base frames relative to the slide base when both backrest support arms are rotated forward from the fixed position, and inhibits the slide movement of each base frame relative to the slide base when both backrest support arms are rotated backward to be returned to the fixed position.

According to the configuration, when both support arms are rotated from the fixed position to move the backrest forward and upward, the seat can be slid forward and upward. Thus, in addition to moving the backrest forward and upward, the seat itself can also be moved forward and upward. Therefore, a larger space can be created between the front seat and the backseat. Accordingly, even in a vehicle in which there is no a sufficient interval between the front seat and the backseat, a passenger can more easily get into the backseat.

BRIEF DESCRIPTION OF THE DRAWINGS

FIG. 6(a) is a cross-sectional view taken along line 6d-6d in FIG. 3;

FIG. 6(b) is a cross-sectional view along line 6e-6e in FIG. 5;

DETAILED DESCRIPTION OF THE PREFERRED EMBODIMENTS

Figure 1:
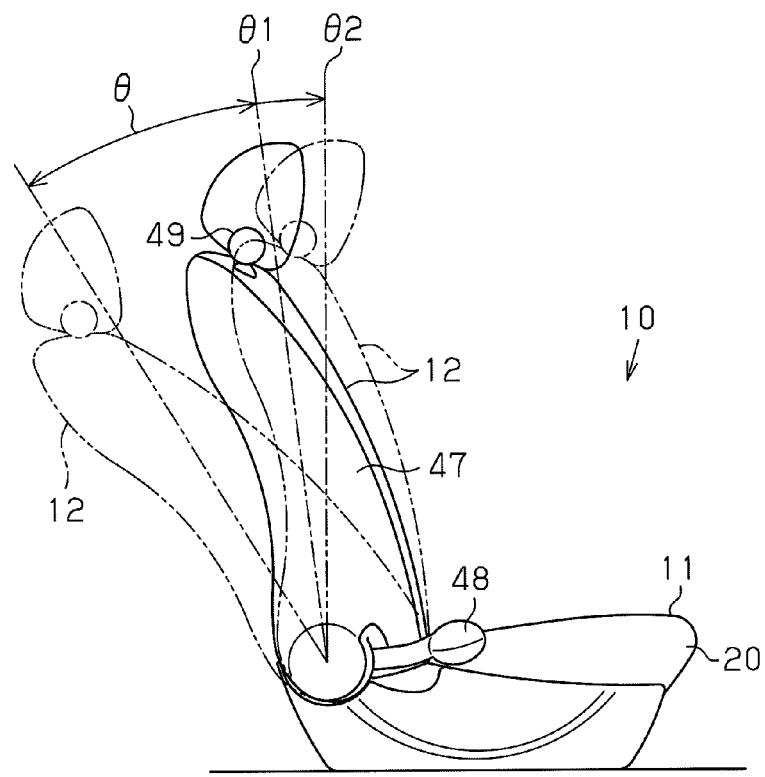
FIGS. 1(a) and 1(b) are side views each showing a vehicle seat of one embodiment of the present invention.
Figure 1:
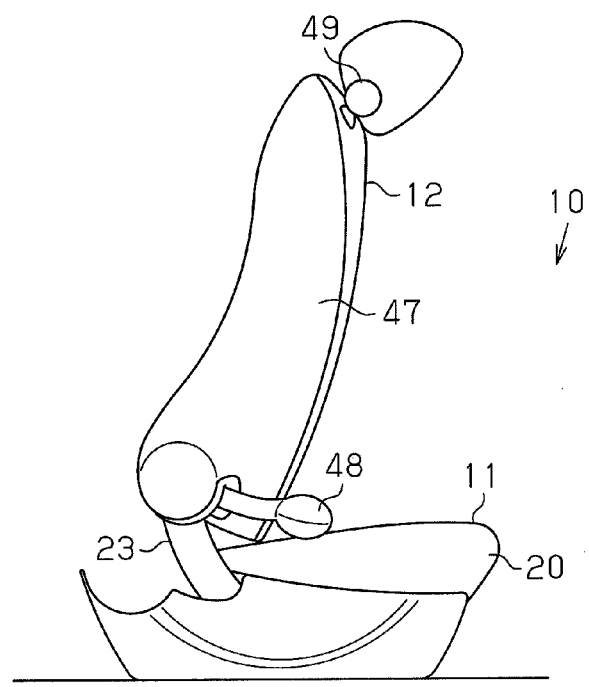

One embodiment according to the present invention will now be described with reference to FIGS. 1 to 10. The description will be made on the assumption that the right side in FIGS. 1(a) and 1(b) is a front side and the left side is a rear side.

Figure 2:
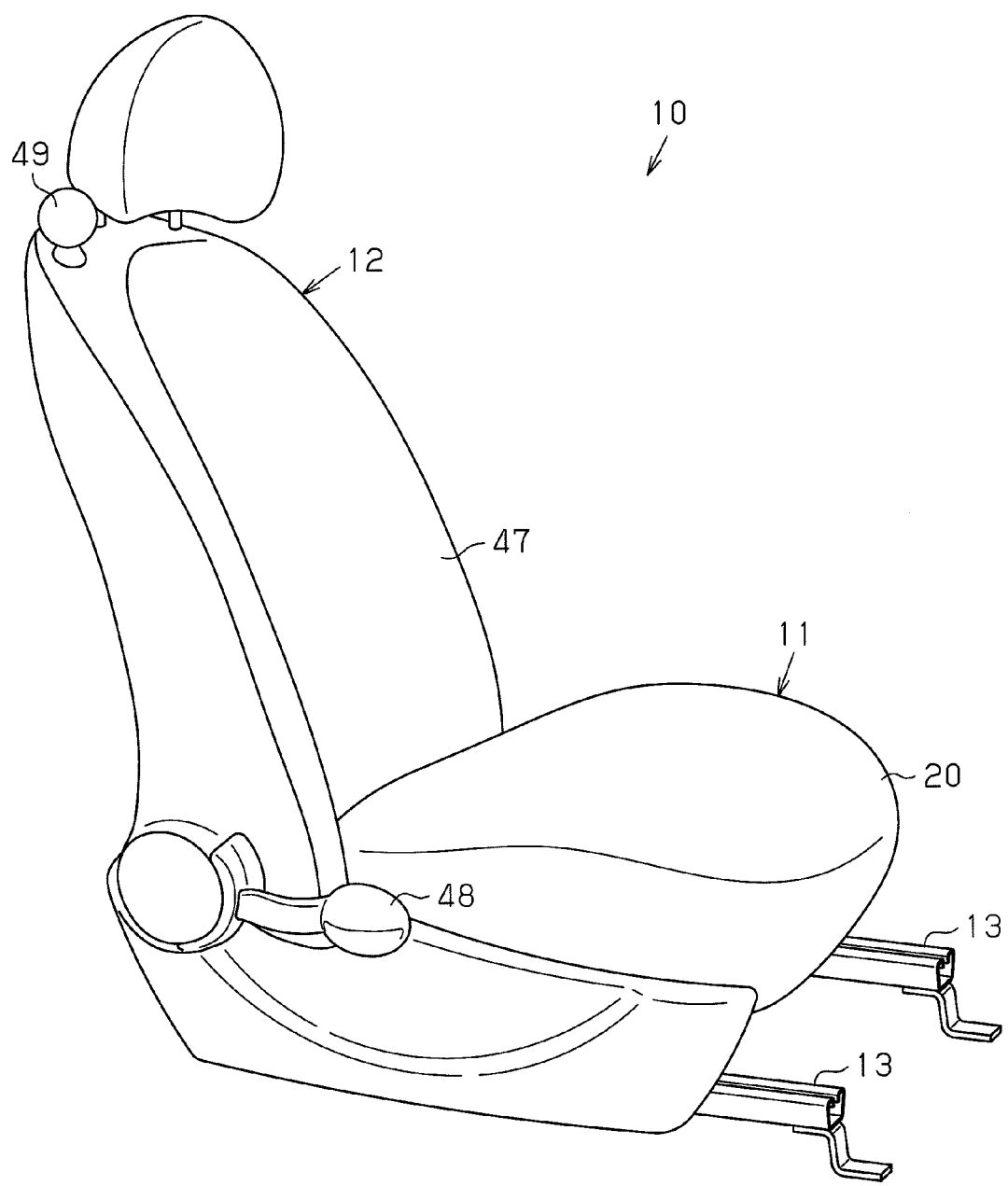
FIG. 2 is a perspective view showing the vehicle seat.

A vehicle seat (hereinafter, simply referred to as "seat") 10 shown in FIG. 2 is a front seat. The seat 10 is provided with a seat portion 11 movable along the back-and-forth direction on a passenger compartment floor. On the seat portion 11, a backrest 12 rotatable in the back-and-forth direction is supported. An angle (upright angle) of the backrest 12 relative to the seat portion 11 is adjustable.

Figure 3:
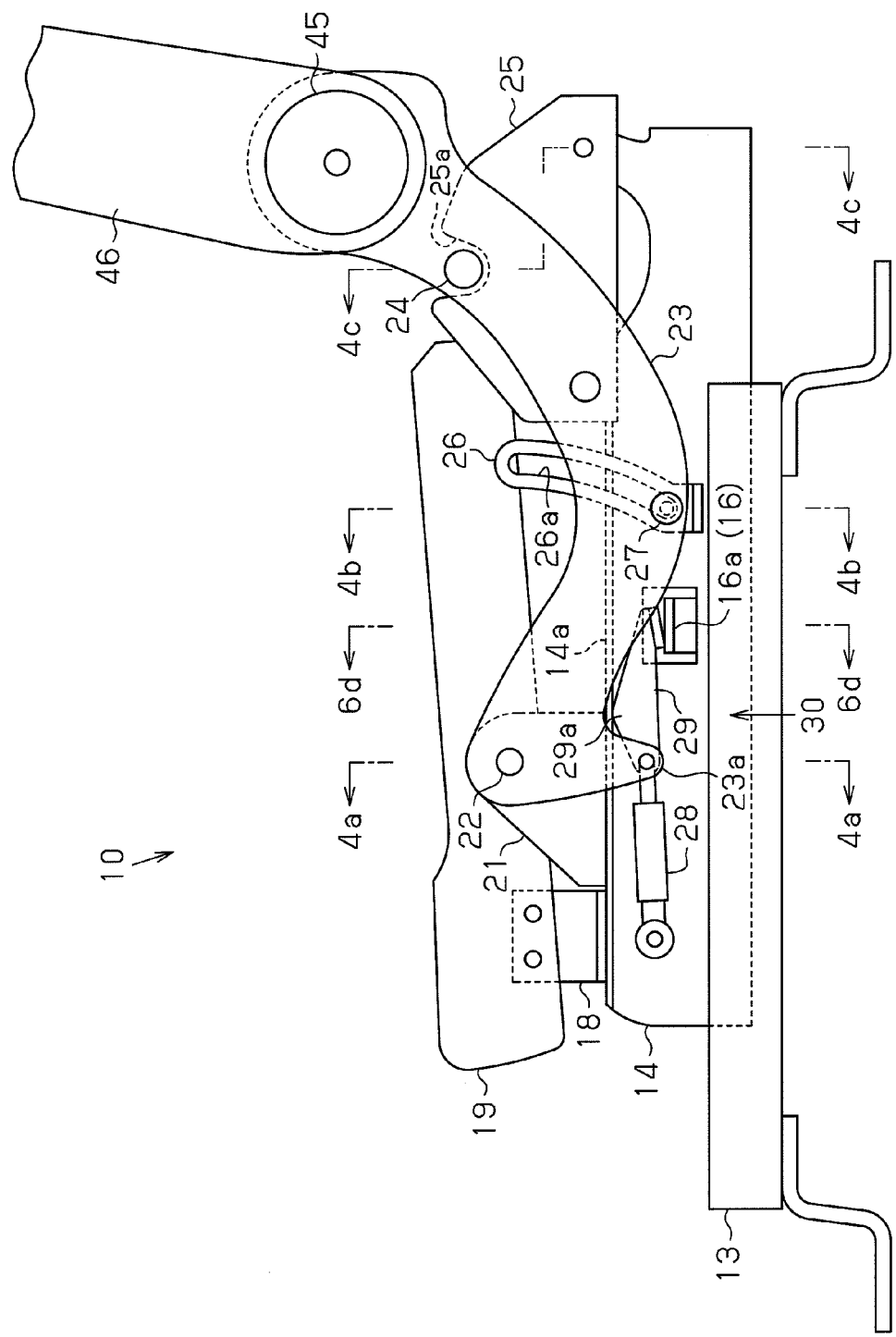
FIG. 3 is a side view showing the internal structure of the vehicle seat.

As shown in FIG. 3, the seat 10 is provided with a pair of slide bases 13 fixed on the passenger compartment floor. On each slide base 13, a base frame 14 for supporting the seat portion 11 is movably supported along the back-and-forth direction.

Figure 4A:
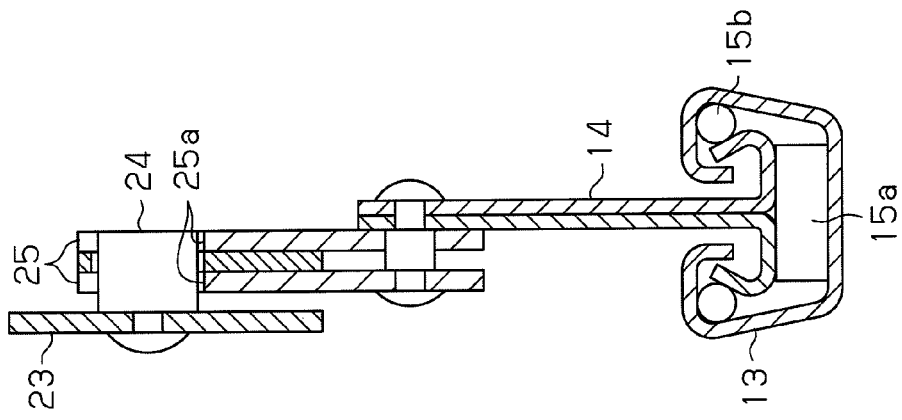
FIG. 4(a) is a cross-sectional view taken along line 4a-4a in FIG. 3.
Figure 4B:
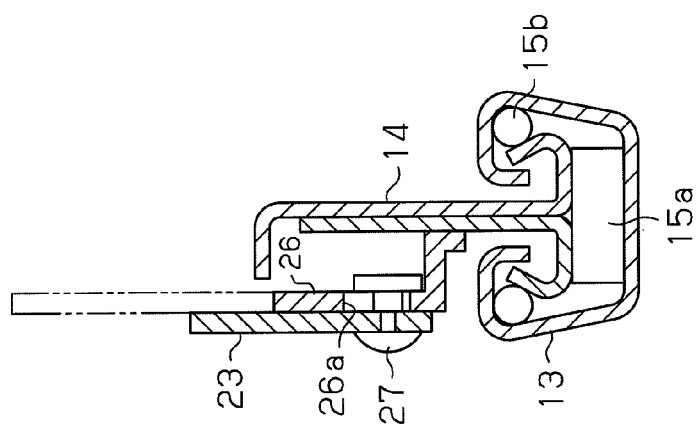
FIG. 4(b) is a cross-sectional view taken along line 4b-4b in FIG. 3.
Figure 4C:
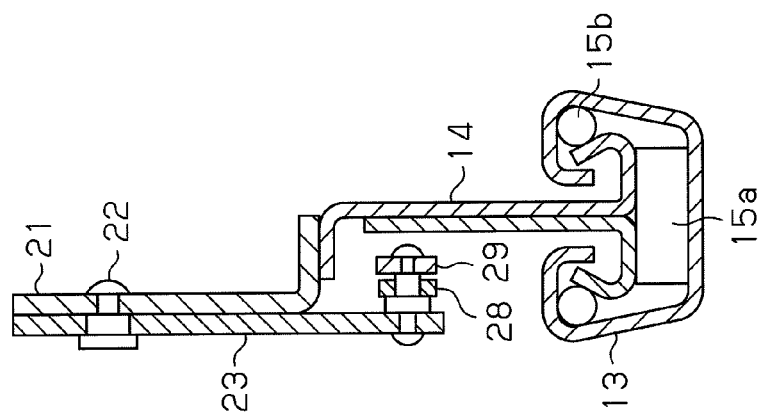
FIG. 4(c) is a cross-sectional view taken along line 4c-4c in FIG. 3.

As shown in FIGS. 4(a) to 4(c), the base frame 14 is movably supported relative to each slide base 13 with a plurality of rollers 15a and balls 15b. As shown in FIGS. 6(a) to 6(b), in the base frame 14, an engaging piece 16 is rotatably supported. The engaging piece 16 inhibits or permits sliding of each base frame 14 relative to the slide base 13. The engaging piece 16 is provided with a pressing portion 16a pressed from above and an engaging portion 16b that can be engaged with any one of a plurality of engaging holes 13a formed on the side wall of the slide base 13. The engaging portion 16b is biased toward each of the engaging holes 13a by a spring (not shown). In the present embodiment, the slide base 13, the engaging piece 16, the spring form a slide lock mechanism 17 for inhibiting or permitting the sliding of the base frame 14 relative to each slide base 13. By an operation of a slide lever (not shown), the engaging piece 16 is switched from a locked position in FIG. 6(a), at which an engaging portion 16b and the engaging hole 13a are engaged, to an unlocked position in FIG. 6(b), at which the engagement between the engaging portion 16b and the engaging hole 13a is cancelled. The seat 10 can be slid along the back-and-forth direction in a state where the engaging piece 16 is switched to the unlocked position so as to adjust the position in the back-and-forth direction of the seat 10.

As shown in FIG. 3, on the base frame 14, a seat portion frame 19 is supported with a bracket 18. The seat portion 11 is configured so that a spring (not shown), a seat portion cushion 20 in FIG. 2, etc., are assembled in the seat portion frame 19.

As shown in FIGS. 3 and 4(a), at the front of the base frame 14, a front bracket 21 is fixed. A support pin 22 is fixed to the front bracket 21. In the support pin 22, a pair of backrest support arms (hereinafter, referred to as "support arm") 23 for supporting the backrest 12 are rotatably supported. Each support arm 23 extends backward and is gradually curved upward. At the rear end of each support arm 23, a stopper pin 24 is fixed.

As shown in FIGS. 3 and 4(c), at the rear of the base frame 14, a pair of rear brackets 25 are fixed. Each rear bracket 25 is formed with a locking recess 25a. Inside each locking recess 25a, the stopper pin 24 of each support arm 23 is placed to be movable thereinto and therefrom. When the stopper pin 24 contacts the edge of the locking recess 25a of both rear brackets 25, the rotation of each support arm 23 in a clockwise direction shown in FIG. 3 is restricted. Thereby, the support arm 23 is placed at a predetermined fixed position relative to the base frame 14.

Figure 5:
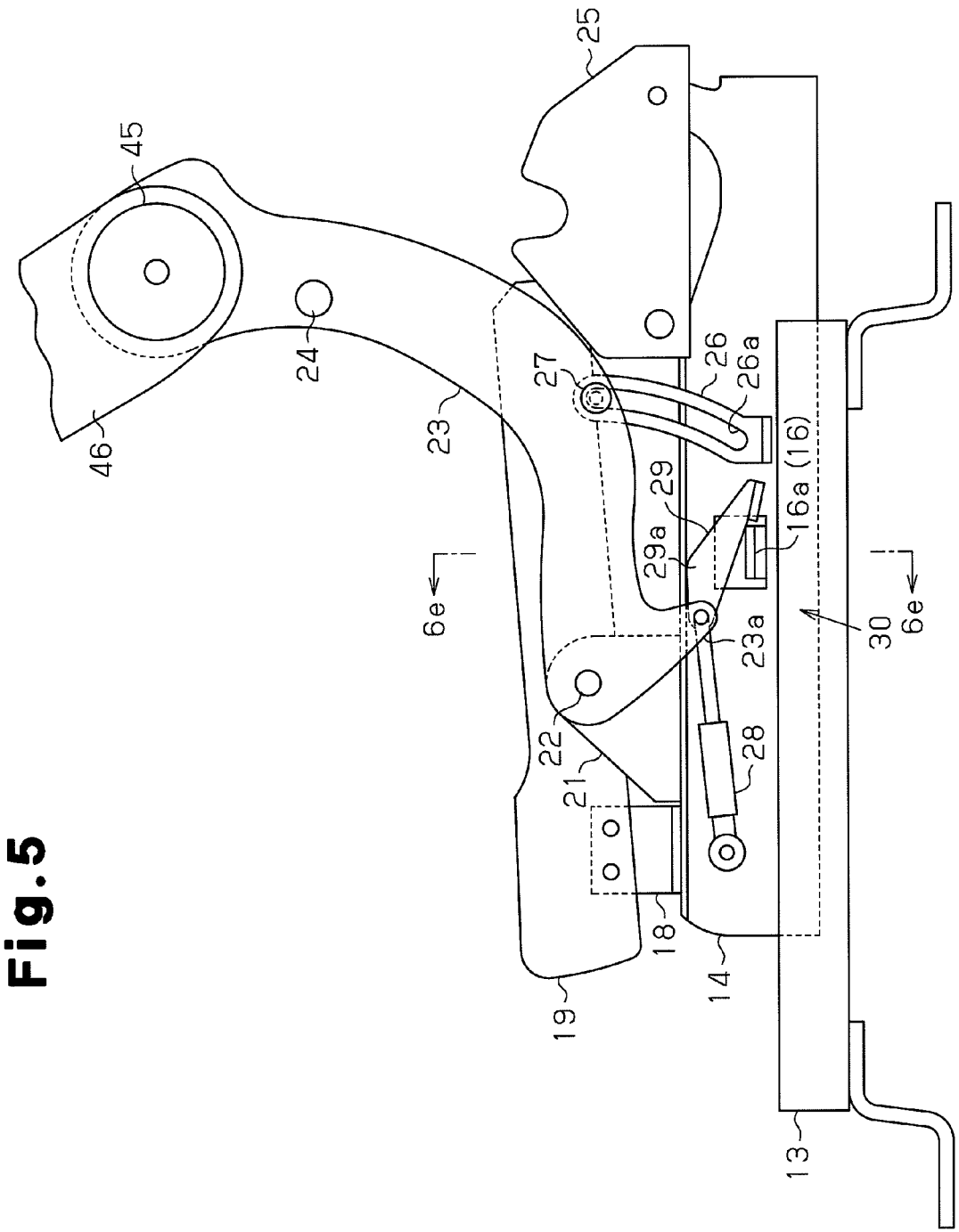
FIG. 5 is a side view showing the internal structure of the vehicle seat.

As shown in FIGS. 3 and 4(b), in the base frame 14, a guide member 26 for regulating the rotation of the support arm 23 is fixed between the front bracket 21 and the rear bracket 25. The guide member 26 is formed with a guide groove 26a extending along a circular arc. With the guide groove 26a, a guide pin 27 fixed to the support arm 23 is engaged. As shown in FIG. 5, when the guide pin 27 contacts the upper end of the guide groove 26a of the guide member 26, the rotation of the support arm 23 to a front-and-upward direction (in a counterclockwise direction shown in FIG. 5) is restricted.

As shown in FIGS. 3 and 5, a fixed end of a gas spring 28 is coupled to the front of the base frame 14. A movable end of the gas spring 28 is coupled to an extension 23a that is extended downward from the front end of each support arm 23. The gas spring 28 is biased in a direction in which the support arm 23 is rotated forward and upward (in a counterclockwise direction shown in FIGS. 3 and 5) by means of the extension 23a.

As shown in FIGS. 3 and 6(a), the proximal end of a movable piece 29 is coupled to the extension 23a of the support arm 23. The distal end of the movable piece 29 is placed at a position to face the pressing portion 16a of the engaging piece 16. At an intermediate portion of the movable piece 29, an apex portion 29a projecting upward is formed. At an upper side of the base frame 14, a protrusion 14a extending horizontally is formed. The apex portion 29a of the movable piece 29 is placed immediately below the bottom surface of the protrusion 14a. As shown in FIGS. 5 and 6(b), along with the rotation of each support arm 23 in a forward-and-upward direction, the movable piece 29 rotates in a clockwise direction around the apex portion 29a, as a fulcrum contacting the bottom surface of the protrusion 14a. The distal end of the movable piece 29 presses the pressing portion 16a in a downward direction to cause the pressing portion 16a of the engaging piece 16 to rotate downward. Thereby, as shown in FIG. 6(b), the engaging portion 16b of the engaging piece 16 is removed from the engaging hole 13a of the slide base 13, and as a result, the slide movement of the base frame 14 relative to the slide base 13 is permitted. In the embodiment, a slide operation mechanism 30 is configured by both support arms 23, the movable piece 29, and the engaging piece 16. The slide operation mechanism 30 actuates the slide lock mechanism 17 based on the rotation of both support arms 23.

Figure 7A:
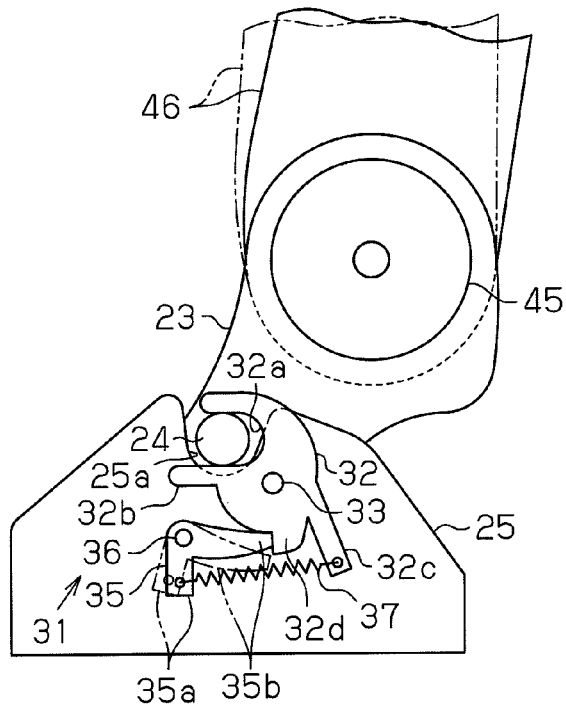
FIGS. 7(a) and 7(b) are side views each showing a rotation lock mechanism.
Figure 7B:
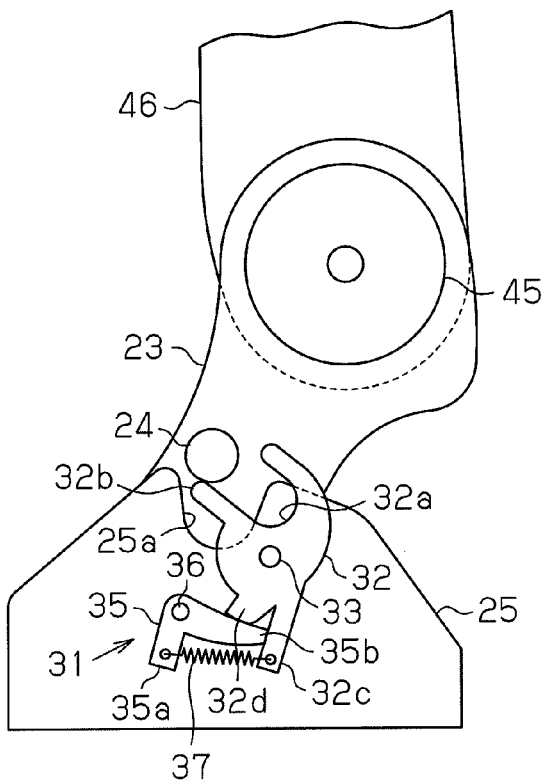

As shown in FIGS. 7(a) and 7(b), both rear brackets 25 are formed with a rotation lock mechanism 31 that inhibits or permits the forward-and-upward rotation of each support arm 23 placed at a fixed position. The rotation lock mechanism 31 is provided with a lock member 32 for holding the stopper pin 24 within the locking recess 25a. The lock member 32 is rotatably supported relative to each rear bracket 25 (base frame 14) by means of a first support shaft 33. The lock member 32 is formed with an engaging recess 32a that is engaged with the stopper pin 24, a contact piece 32b that contacts the stopper pin 24 within the engaging recess 32a, an extension piece 32c that is extended downward, and a claw 32d.

The rotation lock mechanism 31 is provided with a first operation lever 35 for switching a rotation position of the lock member 32 to a locked position or an unlocked position. The first operation lever 35 is substantially L-shaped. The first operation lever 35 is rotatably supported relative to each rear bracket 25 by means of a second support shaft 36. The first operation lever 35 is formed with an extension piece 35a that is extended downward and a restriction piece 35b that is extended backward. The extension piece 35a supports a helical extension spring 37 between the extension piece 35a and the extension piece 32c of the lock member 32. The restriction piece 35b is engaged with the claw 32d of the lock member 32 to restrict the rotation of the lock member 32.

Figure 8A:
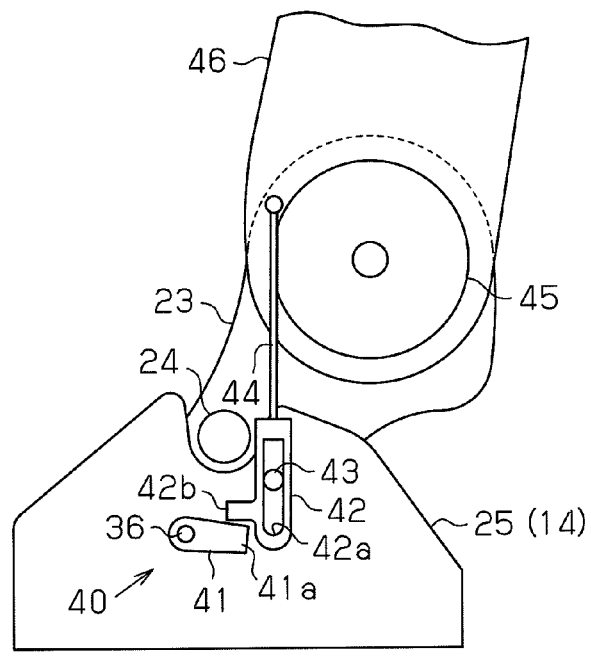
FIGS. 8(a) and 8(b) are side views each showing a support arm operation mechanism.
Figure 8B:
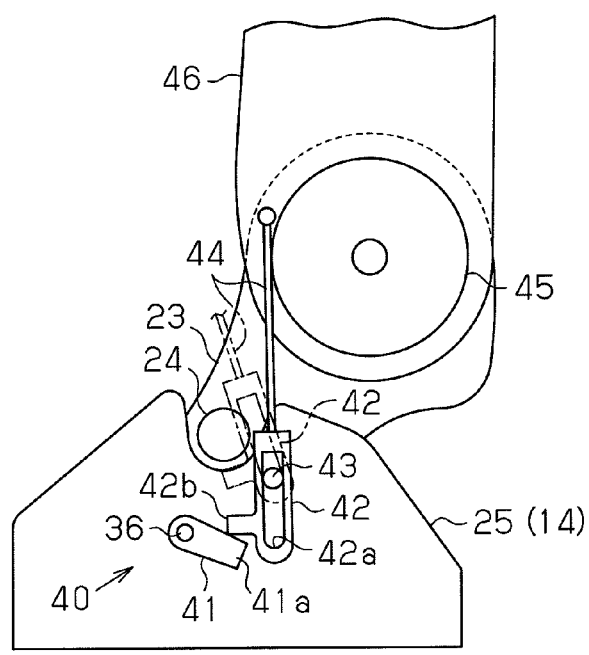

As shown in FIGS. 8(a) and 8(b), support arm operation mechanisms 40 are provided inside both rear brackets 25. Each support arm operation mechanism 40 actuates the rotation lock mechanism 31 based on the inclination of the backrest 12.

The support arm operation mechanism 40 is provided with a second operation lever 41 and an operation member 42. The second operation lever 41 is fixed to the second support shaft 36 of the rotation lock mechanism 31. The second operation lever 41 is rotated integrally with the first operation lever 35 about the second support shaft 36. The operation member 42 rotates the second operation lever 41 based on tilting of the backrest 12. The operation member 42 extends substantially along a vertical direction. The operation member 42 is formed with a guide groove 42a and a projection 42b. A guide pin 43 fixed to each rear bracket 25 is engaged with the guide groove 42a. The projection 42b contacts a movable end 41a of the second operation lever 41. To the upper end of the operation member 42, the lower end of an operation rod 44 is coupled. The operation member 42 is supported movably along an approximately vertical direction by the operation rod 44, while guiding the guide pin 43 within the guide groove 42a. To the backrest 12, the upper end of the operation rod 44 is rotatably coupled. When the backrest 12 is tilted forward, the operation member 42 moves downward by means of the operation rod 44. At this time, the projection 42b presses the movable end 41a of the second operation lever 41, rotating the second operation lever 41 in a clockwise direction. Such rotation of the second operation lever 41 permits switching of the position of the lock member 32, by means of the first operation lever 35, from a locked position shown in FIG. 7(a) to an unlocked position shown in FIG. 7(b). Alternatively, when each support arm 23 is rotated forward and upward from the fixed position, the operation member 42 is moved upward from a position indicated by a solid line in FIG. 8(b) to a position indicated by a dotted-dashed line in a state where the guide groove 42a is restrained by the guide pin 43. In the present embodiment, the support arm operation mechanism 40 is configured by the second operation lever 41, the operation member 42, the guide pin 43, and the operation rod 44.

Figure 9:
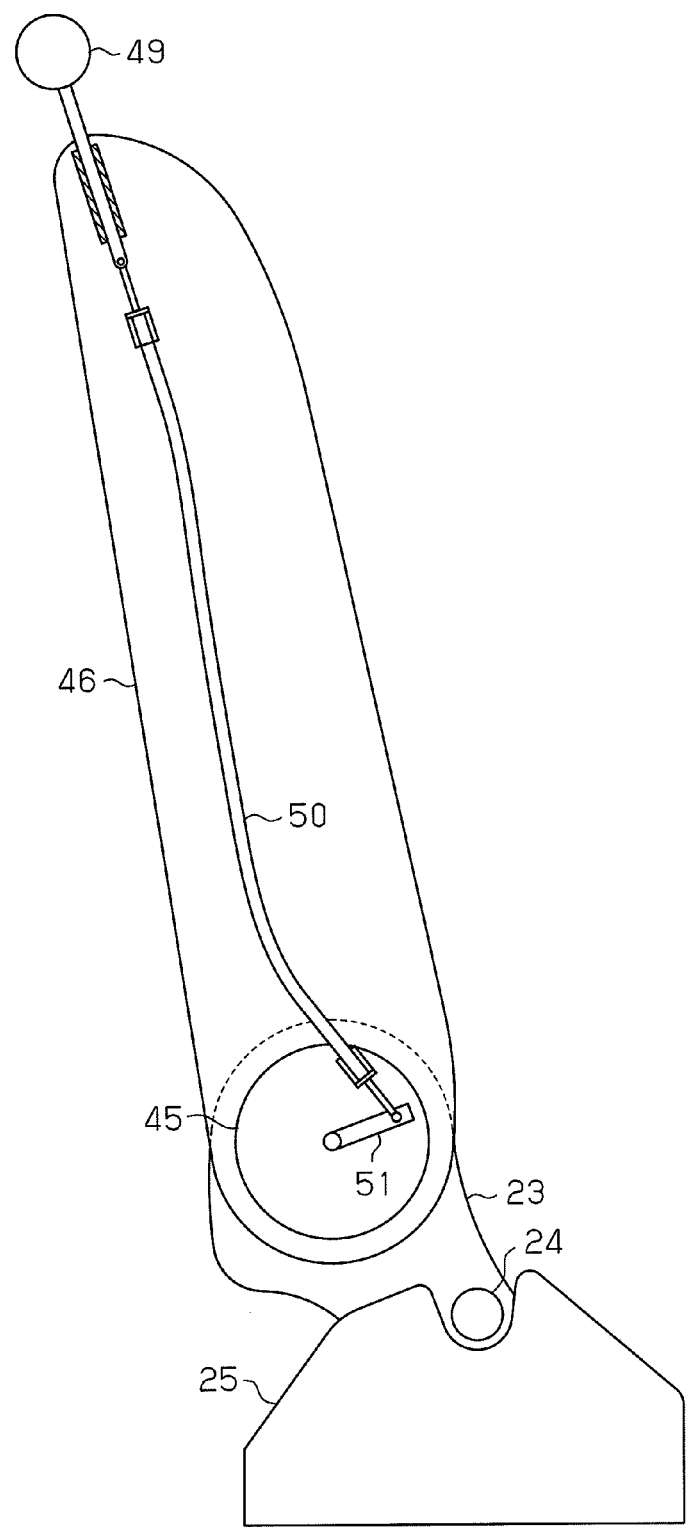
FIG. 9 is a side view showing a coupling mechanism of a walk-in mechanism knob and a reclining mechanism.

As shown in FIG. 9, in the rear end of the support arm 23, a backrest frame 46 is rotatably supported by means of a known reclining mechanism 45. The backrest 12 is configured so that a spring (not shown) and a backrest cushion (illustrated in FIG. 2) 47 are assembled into the backrest frame 46.

As shown in FIGS. 1(a), 1(b), and 2, when a reclining lever 48 that is extended forward and upward from the reclining mechanism 45 or a walk-in mechanism knob 49 provided at the shoulder of the backrest 12 is operated, the fixed state of the backrest 12 relative to the seat portion 11 is cancelled. The reclining mechanism 45 serves to adjust an upright angle of the backrest 12 within a predetermined reclining angle range θ, as shown in FIG. 1(a). In a state where the reclining lever 48 or the walk-in mechanism knob 49 is operated, the reclining mechanism 45 biases the backrest 12 with a spring (not shown) in a manner to incline forward the backrest 12 beyond an maximum forward adjustment angle θ1 of the reclining angle range θ. Thereby, the backrest 12 is held at a maximum forward tilt angle θ2 indicated by a chain double-dashed line in FIG. 1(a). As shown in FIG. 9, the walk-in mechanism knob 49 is coupled through a wire 50 to a lock releasing lever 51 of the reclining mechanism 45.

At the time of normal use of the seat 10, when the reclining lever 48 is operated, the reclining mechanism 45 is released from the fixed state. Thereby, the upright angle of the backrest 12 can be adjusted within the reclining angle range θ. When a slide lever (not shown) is operated, the slide lock mechanism 17 is released from the fixed state. Thereby, the seat 10 can be slid along a back-and-forth direction, and thus, a position in the back-and-forth direction of the seat 10 can be adjusted.

When a passenger gets into the backseat, if the walk-in mechanism knob 49 is pulled up, the lock releasing lever 51 of the reclining mechanism 45 is rotated by means of the wire 50. Thereby, the fixed state of the backrest 12 relative to the seat portion 11 is cancelled. As a result, the backrest 12 is biased by the reclining mechanism 45 so as to be tilted forward to the maximum forward tilt angle θ2 beyond the maximum adjustable forward tilted angle θ1 indicated by a chain double-dashed line in FIG. 1(a).

When the backrest 12 is tilted forward beyond the maximum forward adjustment angle θ1, as shown in FIGS. 8(a) and 8(b), the operation member 42 is moved downward by means of the operation rod 44. The projection 42b presses down the movable end 41a of the second operation lever 41, and thus, the second operation lever 41 is rotated in a clockwise direction. At this time, the first operation lever 35, together with the second operation lever 41, is rotated, and thus, as indicated by a chain double-dashed line in FIG. 7(a), the restriction piece 35b of the first operation lever 35 is removed from the claw 32d of the lock member 32. As a result, a state where the rotation of the lock member 32 is restricted by the first operation lever 35 is cancelled. However, the stopper pin 24 contacts the contact piece 32b of the lock member 32, and thus, the rotation of the lock member 32 in a clockwise direction is restricted. As a result, the lock member 32 is held at a position indicated in FIG. 7(a).

When the backrest 12 is pushed by a hand forward and upward from this state, both support arms 23 are further rotated forward and upward about the support pin 22 shown in FIG. 3. At this time, as shown in FIG. 7(b), the stopper pin 24 is moved upward, and thus, along therewith, the stopper pin 24 is separated from each locking recess 25a of the rear bracket 25. Thereafter, by the biasing force of the helical extension spring 37, the lock member 32 is rotated in a clockwise direction. Such rotation of the lock member 32 is restricted as a result of the restriction piece 35b of the first operation lever 35 contacting the extension pieces 32c of the lock member 32.

Along with the rotation of both support arms 23, the backrest 12 is rotated forward and upward the support pin 22. At this time, by the biasing force of the gas spring 28, the backrest 12 can be easily rotated forward and upward. As shown in FIG. 5, the backrest 12 is rotated to a position at which the upward movement of the guide pin 27 is restricted by the guide member 26. In this way, the backrest 12 is moved forward and upward from a rear upper portion of the seat portion 11, and held at a position indicated in FIG. 1(b).

As shown in FIG. 7(b), when the stopper pin 24 is separated from the locking recess 25a of the rear bracket 25 along with the forward-and-upward rotation of the backrest 12, the lock member 32 is rotated in a clockwise direction by the biasing force of the helical extension spring 37. Such rotation of the lock member 32 is restricted as a result of the restriction piece 35b of the first operation lever 35 contacting the extension pieces 32c of the lock member 32.

When the backrest 12, together with both support arms 23, is rotated, as indicated by a chain double-dashed line in FIG. 8(b), the operation member 42 is moved forward and upward by means of the operation rod 44. Thus, the projection 42b of the operation member 42 is moved apart from the movable end 41a of the second operation lever 41. On the other hand, although the first operation lever 35 is biased in a counterclockwise direction by the helical extension spring 37 while contacting the restriction piece 35b with the extension piece 32c of the lock member 32, the first operation lever 35 brings the restriction piece 35b into contact with an outer peripheral surface of the claw 32d of the lock member 32. Therefore, the first operation lever 35 is held at a position indicated in FIG. 7(b) due to the contact between the restriction piece 35b and the claw 32d. At the same time, the lock member 32 is held at a position indicated in FIG. 7(b) since it is supported by the restriction piece 35b while being biased in the clockwise direction by the biasing force of the helical extension spring 37.

As shown in FIG. 5, along with the rotation of both support arms 23, the extension 23a is rotated about the support pin 22 and the proximal end of the movable piece 29 is moved upward. Thereafter, the movable piece 29 brings the apex portion 29a into contact with the bottom surface of the protrusion 14a of the base frame 14, and rotates in a clockwise direction. Thereby, the distal end of the movable piece 29 is moved downward to press down the pressing portion 16a of the engaging piece 16. As a result, as shown in FIG. 6(b), the pressing portion 16a of the engaging piece 16 is rotated downward, and thus, the engaging portion 16b is removed from the engaging hole 13a of the slide base 13. As a result, the fixed state of the base frame 14 relative to the slide base 13 is cancelled. Consequently, the base frame 14 is slid to a predetermined maximally advanced position by the biasing force of the spring.

Therefore, as shown in FIG. 1(b), the backrest 12 is moved forward and upward while being tilted forward to the maximum forward tilt angle, and in addition, the seat 10 can be slid forward and upward. This leads to the formation of a large space between the front seat and the backseat. This state corresponds to a walk-in state of the seat 10, in which a getting in operation in a backseat can be easily performed.

To restore the seat 10 from the walk-in state to the normal use state, the backrest 12 in a forward tilted state is first pushed by hand backward and downward, and the backrest 12, together with both support arms 23, is rotated backward. As a result, as shown in FIG. 7(b), the stopper pin 24 contacts the contact piece 32b of the lock member 32, which presses down the contact piece 32b. Therefore, the lock member 32 is rotated in a counterclockwise direction against the biasing force of the helical extension spring 37. As a result, the stopper pin 24 enters the locking recess 25a of the rear bracket 25, and is held inside the engaging recess 32a of the lock member 32 by the lock member 32. As a result, the support arms 23 are placed at a fixed position indicated in FIG. 7(a). At this time, by the rotation of the lock member 32, as indicated by a chain double-dashed line in FIG. 7(a), the restriction piece 35b of the first operation lever 35 is in a state capable of engaging with the claw 32d. However, when the support arms 23 are placed at the aforementioned fixed position, the projection 42b of the operation member 42 contacts the movable end 41a of the second operation lever 41 so that the movable end 41a is pressed downward. Therefore, the restriction piece 35b is held at a position indicated by a chain double-dashed line, resulting in a state not to be engaged with the claw 32d. In this state, the backrest 12 is placed at the maximum forward tilt angle θ2 indicated in FIG. 1(a).

Subsequently, when the backrest 12 is pushed from this state by a hand to be further tilted backward, the backrest 12 is tilted to the maximum forward tilt angle θ2, and then, further tilted backward to reach the maximum forward adjustment angle θ1. The backrest 12 is held at the maximum forward adjustment angle θ1 by the reclining mechanism 45. Along with the backward inclination of the backrest 12 at this time, the operation member 42 is moved upward by means of the operation rod 44. At this time, the operation member 42 is moved upward while contacting the projection 42b with the movable end 41a of the second operation lever 41. Thus, the first operation lever 35 is rotated together with the second operation lever 41 by the biasing force of the helical extension spring 37. As indicated by a solid line in FIG. 7(a), the restriction piece 35b of the first operation lever 35 is engaged with the claw 32d of the lock member 32. As a result, the rotation of the lock member 32 is inhibited, and by the lock member 32, the stopper pin 24 is held inside the locking recess 25a of the rear bracket 25. That is, by the support arm operation mechanism 40, the rotation lock mechanism 31 is actuated, and thus, both support arms 23 are fixed at the fixed position. Therefore, in a state where the backrest 12 is held at the maximum forward adjustment angle θ1 by the reclining mechanism 45, the seat 10 is in a normal use state.

The reclining lever 48 is operated from this state to actuate the reclining mechanism 45, and thereby, the backrest 12 can be adjusted to a desired upright angle. Further, the slide lever (not shown) is operated to actuate the slide lock mechanism 17, and thereby, the backrest 12 can be adjusted to a position in the back-and-forth direction of the seat 10.

The embodiment that has been described in detail has the following advantages.

(1) The vehicle seat 1 is provided with the rotation lock mechanism 31, which inhibits or permits the rotation of both support arms 23 placed at a fixed position relative to the base frame 14, and the support arm operation mechanism 40 actuated by the tilting of the backrest 12. When the backrest 12 is tilted forward beyond the maximum forward adjustment angle θ1 of the reclining angle range, the fixed state at the fixed position of both support arms 23 is cancelled. Further, when the backrest 12 is tilted further backward than the maximum forward adjustment angle θ1, both support arms 23 are fixed at the fixed position.

That is, when the backrest 12 is titled forward beyond the maximum forward adjustment angle θ1 of the reclining mechanism 45, both support arms 23 rotate about the support pin 22 so that the backrest 12 is moved forward and upward. In other words, the backrest 12 is moved forward and upward while being tilted forward maximally. That is, unlike the conventional configuration, the backrest 12 is not moved forward and upward while it is kept tilted backward. In other words, the backrest 12 cannot be moved forward and upward when it is not tilted forward. Therefore, even in a vehicle in which a sufficient interval cannot be secured between the front seat and the backseat, getting into a backseat can be easily performed.

(2) The slide operation mechanism 30 actuates the slide lock mechanism 17 based on the rotation of both support arms 23. When the backrest 12 is moved forward and upward so that both support arms 23 are moved apart from the fixed position, the slide movement of the base frame 14 relative to the slide base 13 is permitted. When the backrest 12 is tilted backward so that both support arms 23 are returned to the fixed position, the slide movement of the base frame 14 relative to the slide base 13 is inhibited.

That is, both support arms 23 are rotated from the fixed position and the backrest 12 is moved forward and upward, so that the seat 10 can be slid forward and upward. In other words, in addition to the forward and upward movement of the backrest 12, the seat 10 itself can be moved forward and upward. In this way, a larger space is created between the front seat and the backseat. Therefore, even in a vehicle in which a sufficient interval cannot be secured between the front seat and the backseat, getting into a backseat can be more easily performed.

It should be noted that the embodiment may be modified as follows.

The slide operation mechanism 30 may be omitted. That is, when the backrest 12 is tilted forward beyond the maximum forward adjustment angle θ1 of the reclining angle range θ, the seat 10 does not need to be slid. When the slide operation mechanism 30 is thus omitted, the configuration of the vehicle seat is simplified.

The slide operation mechanism 30 may actuate the rotation lock mechanism 31 based on the tilting of the backrest 12. In this case, when the backrest 12 is tilted forward beyond the maximum forward adjustment angle θ1, sliding of the base frame 14 relative to the slide base 13 is permitted. When the backrest 12 is tilted further backward than the maximum forward adjustment angle θ1, the slide movement of the base frame 14 relative to the slide base 13 is inhibited. Even in this case, the advantage (1) described in the above embodiment can be obtained.

Figure 10A:
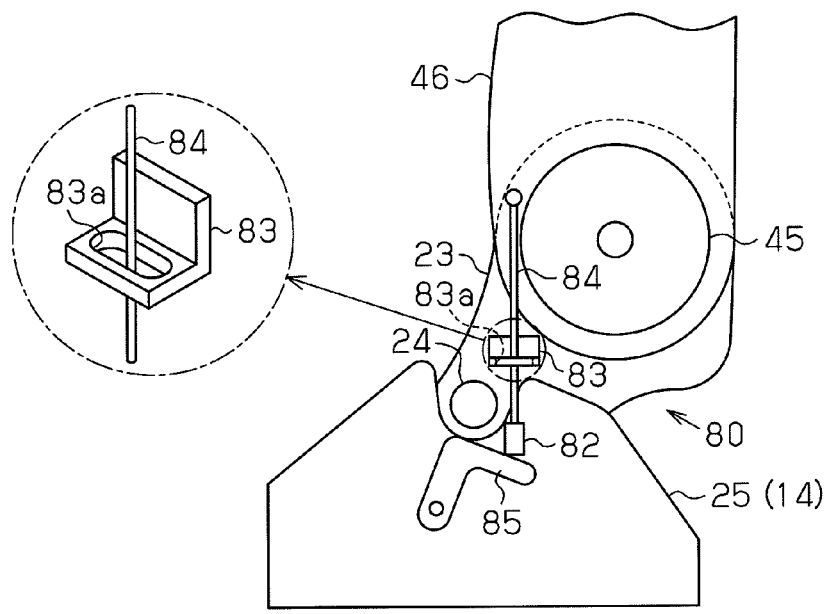
FIGS. 10(a) and 10(b) are side views each showing a support arm operation mechanism of a modification.
Figure 10B:
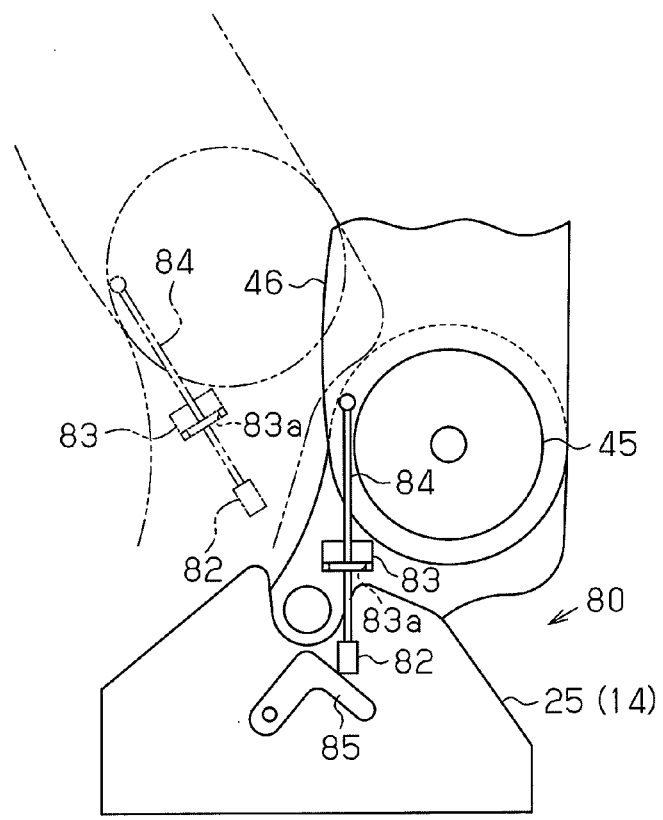
Figure 11:
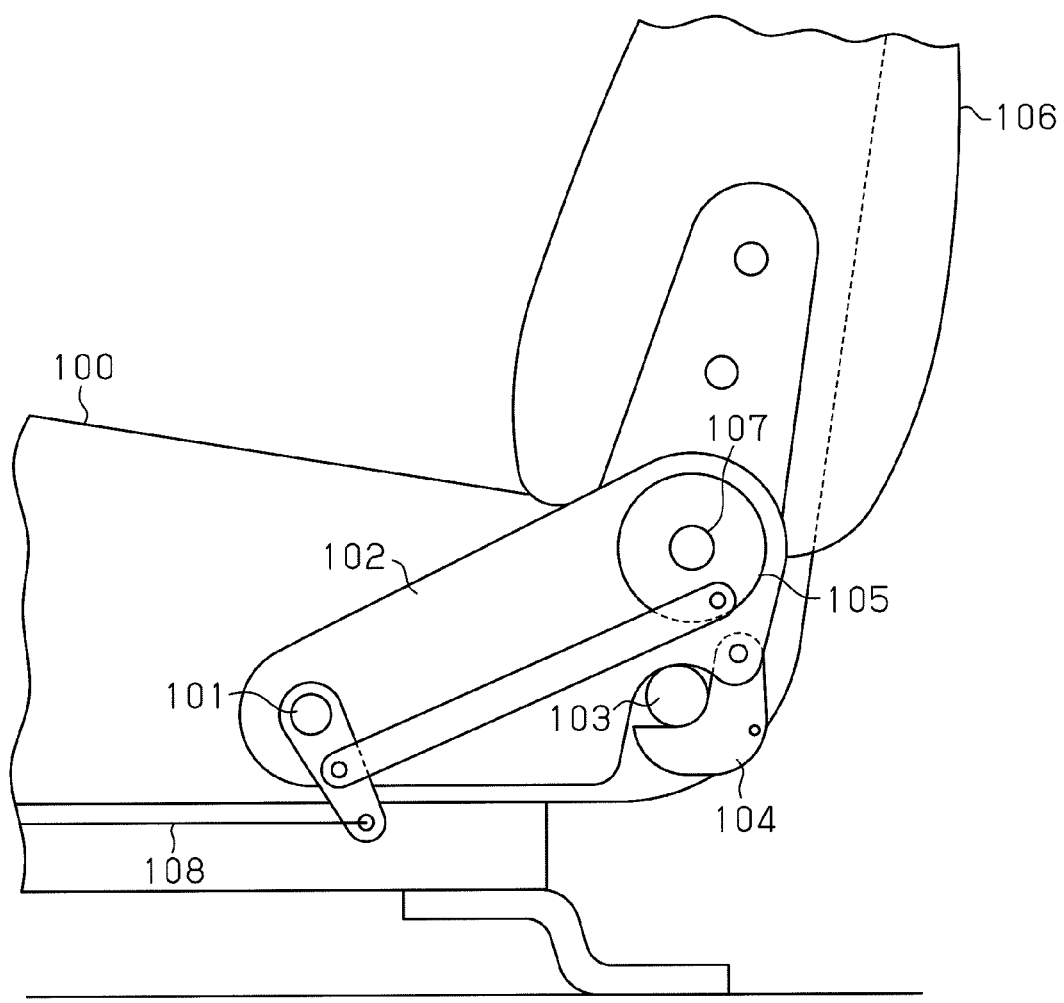
FIG. 11 is a side view showing a conventional vehicle seat.

In the above illustrated embodiment, the support arm operation mechanism 40 may be modified to a support arm operation mechanism 80 as shown in FIGS. 10(a) and 10(b). In this case, the support arm operation mechanism 80 is provided with: an operation rod 84 coupled to the backrest frame 46; an operation member 83 fixed to a side surface of the support arm 23; a pressing member 82 fixed to a distal end of the operation rod 84; and a substantially V-shaped operation lever 85 supported rotatably to the side surface of the rear bracket 25. The operation member 83 has a guide groove 83a for guiding the operation rod 44 that moves vertically along with the rotation of the support arm 23. The guide groove 83a is formed in a horizontally elongated shape to suppress latching with the operation rod 84 that moves vertically. According to the configuration, unlike the vehicle seat of the above embodiment, in which the backrest frame 46 and the rear bracket 25 are coupled by means of the guide pin 43 and the operation member 42, the mechanical coupling between the backrest frame 46 and the rear bracket 25 is omitted. Thus, as compared to the vehicle seat of the above embodiment, the moving distance of the backrest 12 in a forward-and-upward direction can be increased. Therefore, at the time of the walk-in action, the space formed between the front seat and the backseat can be further widened. Further, the guide groove 83a is formed in a horizontally elongated shape, and thus, at the time of moving the backrest 12 forward and upward, the operation member 83 and the operation rod 84 cannot be latched easily.

What is claimed is:

1. A vehicle seat comprising:
    a pair of base frames supporting a seat portion of a vehicle;
    a pair of backrest support arms of which front ends are rotatably supported relative to side surfaces of both base frames;
    a rotation lock mechanism for controlling forward-and-upward rotation of both backrest support arms placed at a predetermined fixed position relative to the both base frames;
    a backrest rotatably supported by rear ends of the both backrest support arms;
    a reclining mechanism for adjusting a reclining angle of the backrest relative to the both base frames,
    wherein the reclining mechanism is configured to position the backrest at an upright angle within a predetermined reclining angle range between a maximum rearward adjustment angle and a maximum forward adjustment angle and to allow the backrest to incline forward beyond the maximum forward adjustment angle to a maximum forward tilt angle; and
    a support arm operation mechanism for actuating the rotation lock mechanism based on tilting of the backrest caused by the reclining mechanism, the support arm mechanism including an operation member and an operation lever,
    wherein actuation of the operation member triggers movement of the operation lever to unlock the rotation lock mechanism such that the support arm operation mechanism permits forward-and-upward rotation of both backrest support arms from the fixed position when the backrest is moved towards the maximum forward tilt angle, and
    wherein the support arm operation mechanism inhibits rotation of both backrest support arms from the fixed position when the backrest is is moved within the predetermined reclining angle range.

2. The vehicle seat according to claim 1, further comprising:
    a slide base supporting slidably and movably the base frames along a back-and-forth direction of the vehicle;
    a slide lock mechanism for controlling a slide movement of the base frames relative to the slide base; and
    a slide operation mechanism for actuating the slide lock mechanism based on rotation of both backrest support arms,
    wherein the slide operation mechanism permits slide movement of the base frames relative to the slide base when both backrest support arms are rotated forward from the fixed position, and inhibits the slide movement of the base frame relative to the slide base when both backrest support arms are rotated backward to be returned to the fixed position.

* * * * *